United States Patent [19]
Chien

[11] Patent Number: 5,754,064
[45] Date of Patent: May 19, 1998

[54] DRIVER/CONTROL CIRCUIT FOR A ELECTRO-LUMINESCENT ELEMENT

[76] Inventor: Tseng Lu Chien, 81 No. 29, Alley 73, Lin-Shen Street, Shi-Chio Town, Taipei, Hseng, Taiwan

[21] Appl. No.: 518,594

[22] Filed: Aug. 11, 1995

[51] Int. Cl.$^6$ ............................................. H03B 1/00
[52] U.S. Cl. ....................... 327/108; 327/110; 315/169.3
[58] Field of Search ................... 315/169.3, 219, 315/220, 221, 222; 329/108, 110, 365

[56] References Cited

U.S. PATENT DOCUMENTS

| | | | |
|---|---|---|---|
| 3,153,745 | 10/1964 | Gurian | 315/206 |
| 4,231,079 | 10/1980 | Heminover | 362/106 |
| 4,383,244 | 5/1983 | Knauff | 340/321 |
| 4,633,141 | 12/1986 | Weber | 315/307 |
| 4,848,009 | 7/1989 | Rodgers | 36/137 |
| 5,245,516 | 9/1993 | de Haas et al. | 362/108 |
| 5,245,517 | 9/1993 | Fenton | 362/156 |
| 5,293,098 | 3/1994 | Brownell | 315/169.3 |
| 5,317,497 | 5/1994 | Belek | 363/40 |
| 5,359,341 | 10/1994 | Hutchings | 345/45 |
| 5,384,456 | 1/1995 | Saika et al. | 250/208.1 |

FOREIGN PATENT DOCUMENTS 0 121 026   10/1984   European Pat. Off. .
0 166 534   1/1986   European Pat. Off. .

*Primary Examiner*—Timothy P. Callahan
*Assistant Examiner*—Jeffrey Zweizig
*Attorney, Agent, or Firm*—Bacon & Thomas

[57] ABSTRACT

A driver/control circuit for a super thin lighting element display includes a DC power supply, a function interface, an inverter, and a component interface. The function interface is implemented by selectable inputs and control outputs of an integrated circuit, while the inverter is made up of the square wave output of the integrated circuit and a transformer isolated from the square wave output by a transistor, the primary winding of the transformer being connected between the power supply and the transistor, with the control electrode of the transistor being connected to the square wave output of the integrated circuit. Preferably, in the case of multiple lighting element control, the component interface includes transistors having control electrodes connected to the control outputs of the integrated circuit, while in the case of multiple lighting elements of different types, the inverter preferably includes either a plurality of transformers or a transformer having a plurality of different secondary windings, or a combination of different transformer and secondary winding arrangements.

21 Claims, 6 Drawing Sheets

| OP2 | OP1 | FUNCTION | ON-TIME RATE | CURRENT CONSUMPTION |
|---|---|---|---|---|
| 1 | 1 | Sequential | 16HZ FLASH 50% | 0.03mA-HOUR/1 TRG |
| 1 | 0 | Scan | 16HZ FLASH 50% | 0.03mA-HOUR/1 TRG |
| 0 | 1 | Flash | 1HZ FLASH 25% | 0.022mA-HOUR/1 TRG |
| 0 | 0 | Steady | 0.5 SEC. 100% | 0.006mA-HOUR/1 TRG |

DRIVER/CONTROL CIRCUIT FOR A ELECTRO-LUMINESCENT ELEMENT

BACKGROUND OF THE INVENTION

1. Field of the Invention

This invention relates to an electrical circuit for activating a super thin lighting element. By "super thin" lighting element is meant a lighting element of the type containing a chemical sandwiched between protective layers, such as an electro-luminescent (EL) strip or panel, which typically has a thickness of less than ten millimeters.

2. Discussion of Related Art

Super thin lighting elements such as electro-luminescent strips or panels offer a number of advantages over conventional lighting elements such as incandescent light bulbs and light emitting diodes. These advantages include flexibility, which allows the lighting elements to follow curves on the object to which they are attached, the ability to be printed or silk-screened with logos, marks, figures, and characters, or to be stenciled or masked, and the availability of a wide variety of color choices, including green, blue, pink, yellow, and white. In addition, super thin lighting elements have the advantage of low assembly and design costs.

These advantages are explained in a number of prior U.S. patent applications and issued patents of the Inventor, including U.S. patent application Ser. Nos. 08/226,322; 08/343,404; 08/343,915; 08/383,404; 08/383,405; 08/421,647; 08/432,707; 08/444,064; 08/436,007, and U.S. Pat. Nos. 5,485,358 and 5,572,817. The present invention concerns a driver circuit for superthin lighting elements which can be used in any of the arrangements described in these applications, as well as in other lighting arrangements.

Control circuits for super thin lighting elements have existed for decades. The Inventor's own prior patents and applications describe circuits which can be implemented in either traditional or integrated circuit form, for converting direct current (DC) from power sources such as a batteries to alternating current (AC) at a voltage and frequency sufficient to cause the electro-luminescent particles in an electro-luminescent element to emit light, with the color and brightness of the light depending in part on the frequency of the electric field applied to the particles by electrodes connected to the inverter or alternating current generating circuit. Further, the prior patents and applications describe "function interfaces" for controlling the timing and duration at which a plurality of super thin lighting elements controlled thereby are activated, in order to obtain special effects such as flashing, chasing, random, sequential, and steady state activation.

In addition to the above-mentioned patents and applications disclosing super thin lighting element control circuits, there is a body of art directed to controlling other types of conventional lighting, such as light emitting diodes (LEDs) or neon tubes. One example of an LED control circuit which includes a function interface capable of activating a plurality of lighting elements according to a predetermined pattern to thereby provide special effects is described in U.S. Pat. No. 4,848,009. This patent describes an integrated circuit controller for LEDs designed to be used on footwear. Similar circuitry has been used to control lighting in a variety of applications, including vehicle lighting and different types of signage and advertising displays.

Despite all of this prior art, however, current electrical driver/control circuits are inadequate in a wide variety of applications in which it is desired that a plurality of super thin lighting elements of different type are to be driven. Because the inventor is the first person to conceive of these applications, it is not surprising that practical solutions to the problem of driving different types of super thin lighting elements have not heretofore been proposed.

Conventional circuitry of the type used to control LEDs or multiple same-type EL strips is useless where different colors and shapes of EL strips are involved because, unlike LEDs which generally have standardized electrical requirements, super thin lighting elements of different sizes and colors have significantly different electrical requirements, with voltage requirements ranging between approximately 60V and 200V at frequencies of between 600 Hz and 3 kHz, depending not only on the size and construction of the super thin lighting element, but also on the desired brightness, service life, and so forth. This problem of different electrical requirements is compounded by the fact that the ideal waveform for activating known super thin lighting elements is a sine wave and that simple pulse control is therefore inadequate.

Of course, in theory, the problem of controlling different types of lighting elements is easily solved by providing separate circuitry for each type of lighting element, or at least an integrated circuit having outputs for each type of element to be controlled, in combination with appropriate component interfaces for each different lighting element. In addition, the problem of controlling lighting elements having different physical requirements has in fact been previously addressed by designers of multi-color neon displays.

In practice, however, such solutions are unacceptable. The problems involved in the design of neon displays are different from those involved in the design of super thin lighting element display circuits are not transferable due to the vastly different power requirements, which makes control circuitry for neon displays inherently more complex and expensive than is practical for super thin lighting element displays. One of the advantages of super thin lighting elements is the low assembly and design costs of displays using such elements, and thus it is desirable to simply the control circuits therefor to the maximum extent possible.

FIG. 9 shows one example of a display for which conventional driver/control circuits are inadequate because multiple different type super thin lighting elements are used. The display is in the form of a 50×65 mm panel on which is printed the image of a cartoon character, and which is surrounded by a plurality of 15×15 mm panels in the form of stars, with the stars arranged to be flashed according to a predetermined pattern while the main panel is steadily illuminated. Because the different EL elements have different internal resistances and other variable factors, such a super thin lighting element display, not to mention more complex displays, has heretofore been essentially impractical due to difficulties in achieving the proper voltage and frequency required to activate the internal phosphor particles of each of the different types of elements to emit light in desired patterns.

SUMMARY OF THE INVENTION

It is accordingly an objective the invention to provide a driver/control circuit for a super thin lighting element display which overcomes the limitations of conventional driver/control circuits by being capable of controlling multiple lighting elements in a simple and cost effective manner.

It is a further objective of the invention to provide a driver/control circuit for a super thin lighting display which overcomes the limitations of conventional driver/control circuits by being capable of controlling multiple elements of different sizes, colors, and/or brightnesses.

It is a still further objective of the invention to provide a driver/control circuit for a super thin lighting element display which overcomes the limitations of conventional driver/control circuits by being capable of controlling multiple different types of super thin lighting elements to exhibit different special effects, such as flashing, sequential, random, fade in-fade out, and chasing effects.

It is yet another objective of the invention to provide a driver/control circuit for a super thin lighting element display in which the inverter is implemented using the square wave oscillator of a simple integrated circuit and a transformer, but in which the primary winding of the transformer is isolated from the square wave output of the integrated circuit.

These objectives are accomplished, in accordance with the principles of a preferred embodiment of the invention, by providing a driver/control circuit for a super thin lighting element display which is made up of a DC power supply, a function interface, an inverter, and a component interface, in which the function interface is provided by selectable inputs and control outputs of an integrated circuit, the inverter is made up of the square wave output of the integrated circuit and a transformer isolated from the square wave output by a transistor, the primary winding of the transformer being connected between the power supply and the transistor, with the control electrode of the transistor being connected to the square wave output of the integrated circuit. Preferably, in the case of multiple lighting element control, the component interface includes transistors having control electrodes connected to the control outputs of the integrated circuit, while in the case of multiple lighting elements of different types, the inverter preferably includes either a plurality of transformers or a transformer having a plurality of different secondary windings, or a combination of different transformer and secondary winding arrangements.

The preferred circuits provide driver and control functions which provide unprecedented flexibility in creating multi-color and animated displays far beyond that of provided by conventional LED, incandescent, or fluorescent display drivers. The super thin lighting elements of a display controlled according to the principles of the invention can provide the effects of both a screen with very even illumination and, in the same display, animation, at a much lower cost and more safely than conventional displays. While the implementation of the invention may appear to be extremely simple in hindsight, the increased versatility provided by the invention is not anticipated or suggested by any known control circuit.

BRIEF DESCRIPTION OF THE DRAWINGS

FIG. 8-A is a schematic circuit diagram showing details of the transformer used in the circuit of FIG. 8.

FIG. 8-B is a table showing characteristics of the integrated circuit shown in FIG. 8.

DETAILED DESCRIPTION OF THE PREFERRED EMBODIMENTS

Figure 1:
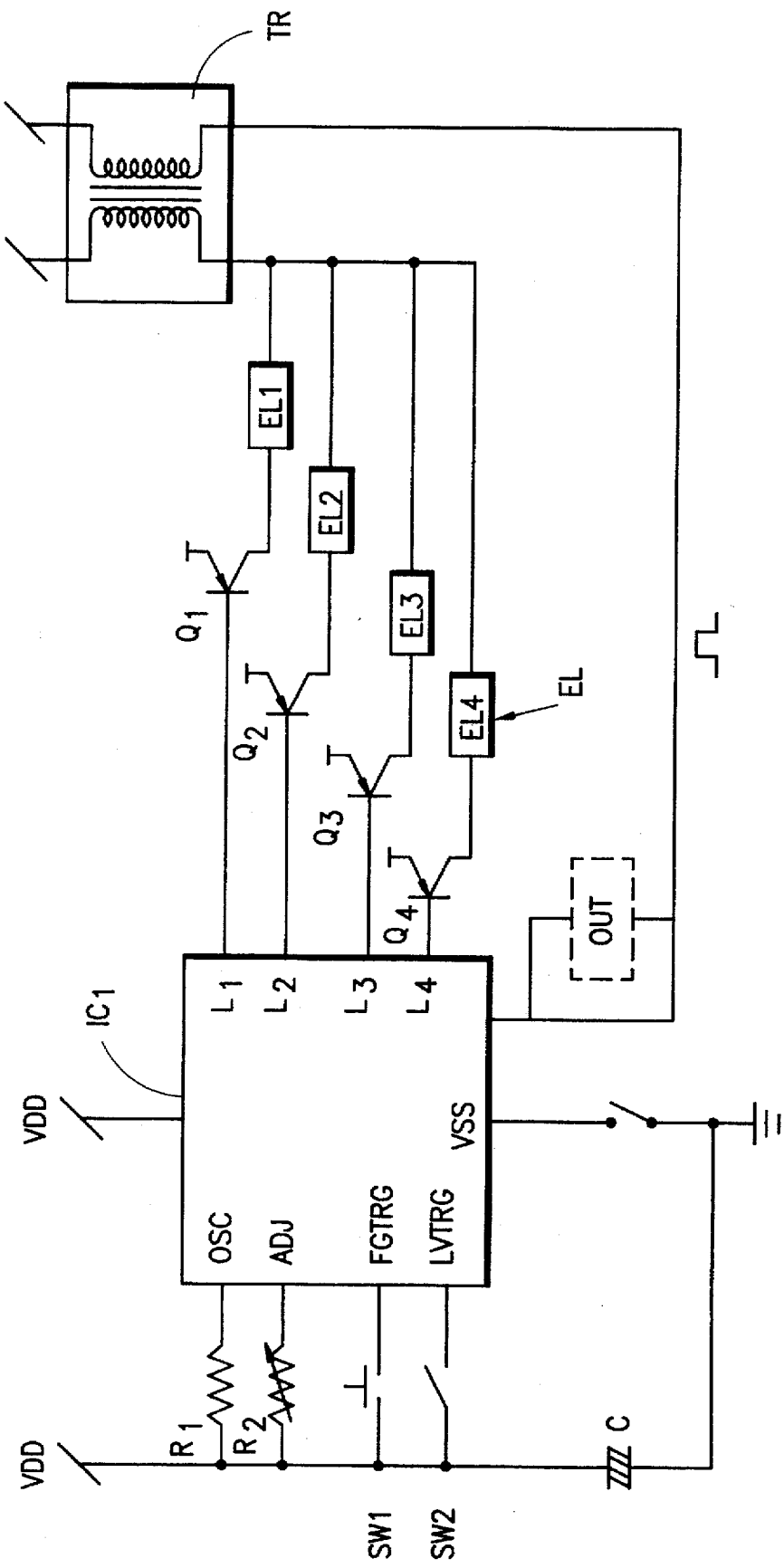
FIG. 1 is a schematic circuit diagram showing an example of a relatively disadvantageous circuit for controlling four same-type electro-luminescent elements.
Figure 2:
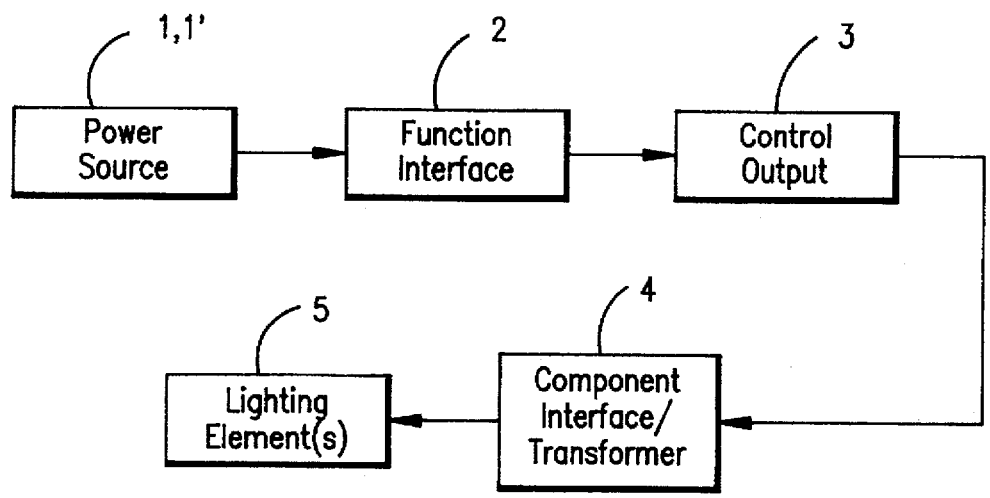
FIG. 2 is a functional block diagram of a super thin lighting element controller constructed in accordance with the principles of a first preferred embodiment of the invention.

FIG. 1 shows, for the purpose of better illustrating the principles of the invention, a circuit which shares with the preferred embodiments of the invention the principle of using an integrated circuit controller and a transformer to convert a DC input to an alternating current of appropriate voltage and frequency, and with a desired timing and duration pattern, but which has certain disadvantages eliminated by the present invention. To the best of the inventor's knowledge, this circuit was first conceived of by the inventor and therefore is not "prior art" with respect to the present invention, although the present invention represents and improvement thereon.

The relatively disadvantageous circuit (in comparison with the present invention, though not necessarily in comparison with prior art circuits) shown in FIG. 1 includes an integrated circuit $IC_1$ having a conventional trigger input FGTRG controlled by a switch SW1, and option select input LVTRG controlled by a switch SW2, an oscillator input OSC, and a frequency adjust input ADJ. More significantly, for illustrative purposes, the disadvantageous circuit of FIG. 1 includes a square wave output OUT connected directly to the primary winding of a transformer TR, with the secondary winding being connected to EL elements EL1–EL4, which in turn are connected to control transistors $Q_1$–$Q_4$, the control electrodes of which are connected to the control outputs $L_1$–$L_4$ of the integrated circuit $IC_1$.

The two main reasons why the circuit shown in FIG. 1 is disadvantageous relative to the present invention is that 1) only one type of lighting element can be controlled thereby, and 2) the oscillator output of the integrated circuit is used to directly drive the EL elements via the transformer limiting the current available to drive the EL elements and making it impossible to achieve an acceptable brightness or to obtain the ideal sine wave necessary to obtain optimal performance from an electro-luminescent element.

In contrast, the circuitry illustrated in FIGS. 2–8 places a "control output" 3 between the function interface 2 provided by the control inputs and outputs of an integrated circuit 6 and the component interface 4 to which the lighting elements 5 are connected. Although the control output in each of the preferred embodiments of the invention is in the form of the square wave output SWO of the integrated circuit 6 and a transistor 8, those skilled in the art will appreciate that other circuit elements could be arranged to perform the same functions, and that the invention in its broadest form should encompass all such elements.

Figure 7:
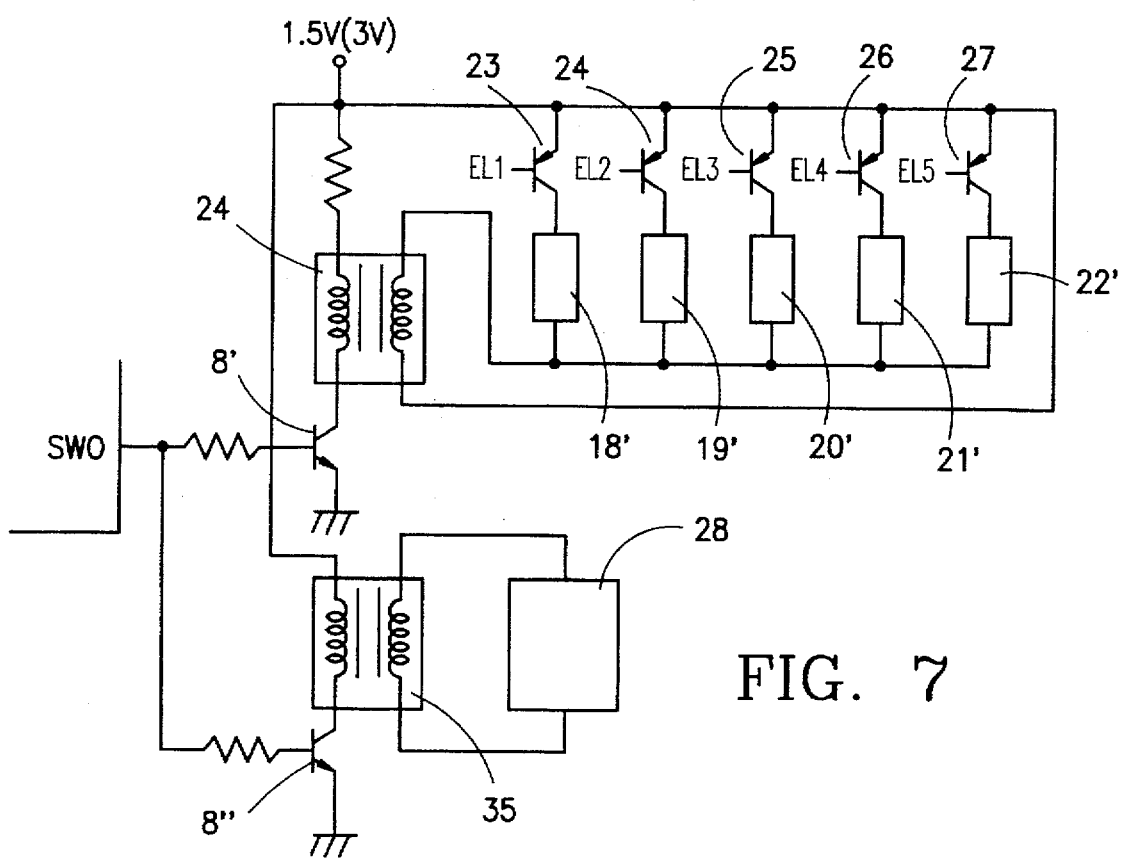
FIG. 7 is a schematic circuit diagram of an arrangement of the preferred circuit for controlling two groups of different size super thin lighting elements using a single inverter circuit.
Figures 8, 8A, 8B:
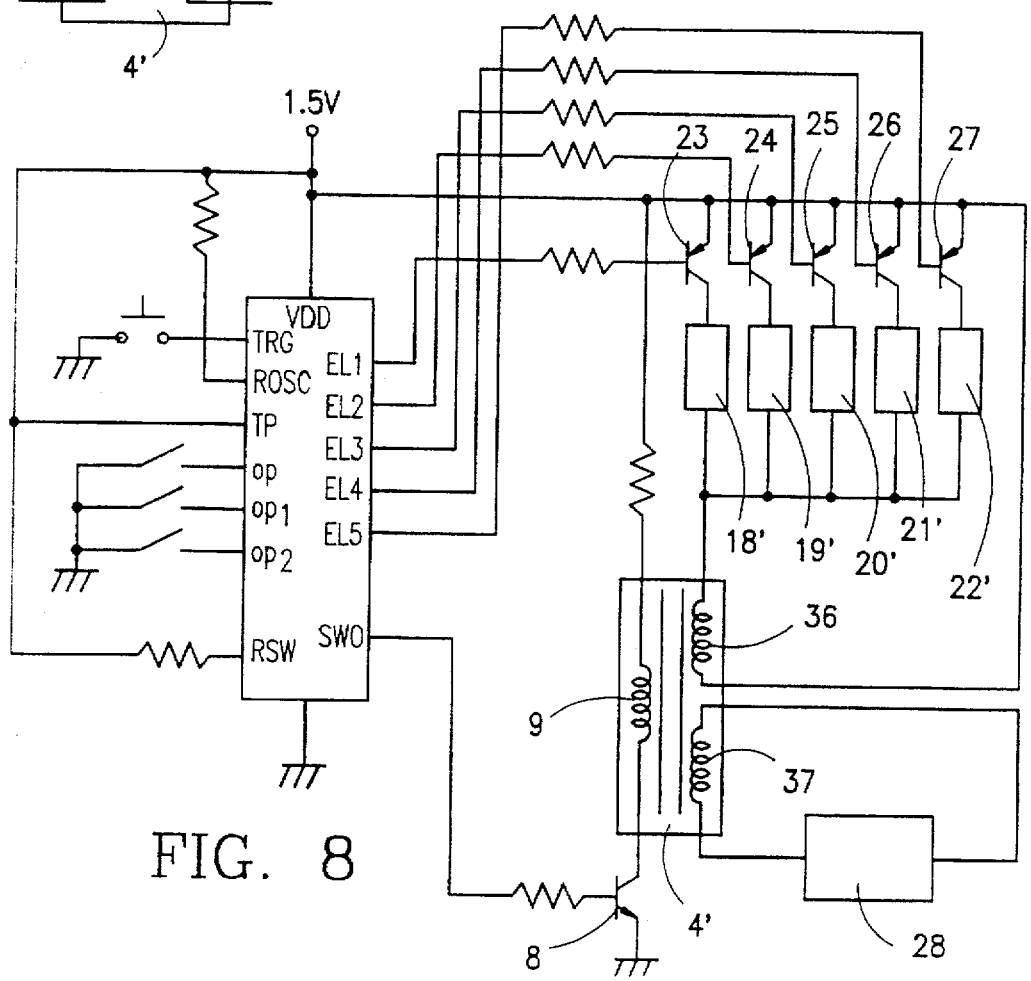
FIG. 8 is a schematic circuit diagram of the preferred circuit arranged to control two groups of different size super thin lighting elements using two inverter circuits.

In addition, in contrast to circuit shown in FIG. 1, the circuits of the preferred embodiments shown in FIGS. 7 and 8 are capable of controlling more than one different type of super thin lighting element, either by providing two different transformers between the control output and the elements, or by splitting the secondary of a single transformer as illustrated in FIG. 8-A.

In each of the preferred embodiments of the invention, the power source is a DC power source 1, illustrated as being at 1.5V, although those skilled in the art will appreciate that multiple different power sources may be used, such as the 3V alternative power source illustrated in FIG. 1. The power source may be in the form of a conventional battery, a conventional rechargeable battery, a solar powered rechargeable battery, and any other DC energy source.

Also in each of the preferred embodiments of the invention, the function interface 2 includes a plurality of inputs to the integrated circuit 6, the settings to which determine the timing and duration of the periods during which the super thin lighting elements to be controlled are activated. These inputs are described in more detail below.

As indicated above, the lighting elements can include one or more electro-luminescent strips or panels of arbitrary shapes and sizes and, in addition, those skilled in the art will appreciate that the invention could also be applied to super thin lighting elements consisting of mixtures of photo-luminescent and electro-luminescent particles or segments.

The basic integrated circuit 6 used in the preferred embodiments is a commercially available square wave oscillator having a control input TRG, toggle/one-shot input TP, cycle input OP, and option inputs OP1, and OP2, a voltage level input ROSC, a square wave output SWO, and as many as five control signal outputs EL1–EL5 (FIGS. 7 and 8).

It will be appreciated that while the details of the integrated circuit 6 may be varied by those skilled in the art, the illustrated integrated circuit has a 1.5 VDC operating voltage, a stand-by current of 2 μA, and an active current consumption of 40 mA. In addition, it is noted that while integrated circuit 6 is illustrated as possessing as many as five control outputs, it is preferred that the number of control outputs be kept to a minimum since the prince of an integrated circuit is largely determined by the total size of the integrated circuit, which is a function of the number of terminals, and thus if the number of lighting elements to be controlled exceeds a small number, it may be preferable to substitute more than one integrated circuit having a fewer number of control outputs for a larger integrated circuit having a greater number of control outputs.

The trigger input TRG of integrated circuit 6 in each of the embodiments is connected to an actuating switch TRSW, which could be in the form of a manual switch or an automatic switch actuated by vibrations, tilting, acceleration, light, or other conditions. The input can either be a toggle type (steady state on/off) or a one-shot type (pulse) switch, depending on whether input TP is set to low or high, but otherwise virtually any type of electrical switch can be connected to the trigger input to turn on a display.

Option select inputs OP1 and OP2 provide the capability of selecting four different square wave output sequences, illustrated in FIG. 8-B, depending on which of the inputs is connected to the high voltage. In addition, input OP permits selection of the number of cycles for which the output is on (3 or 8 in the illustrated example).

Figure 3:
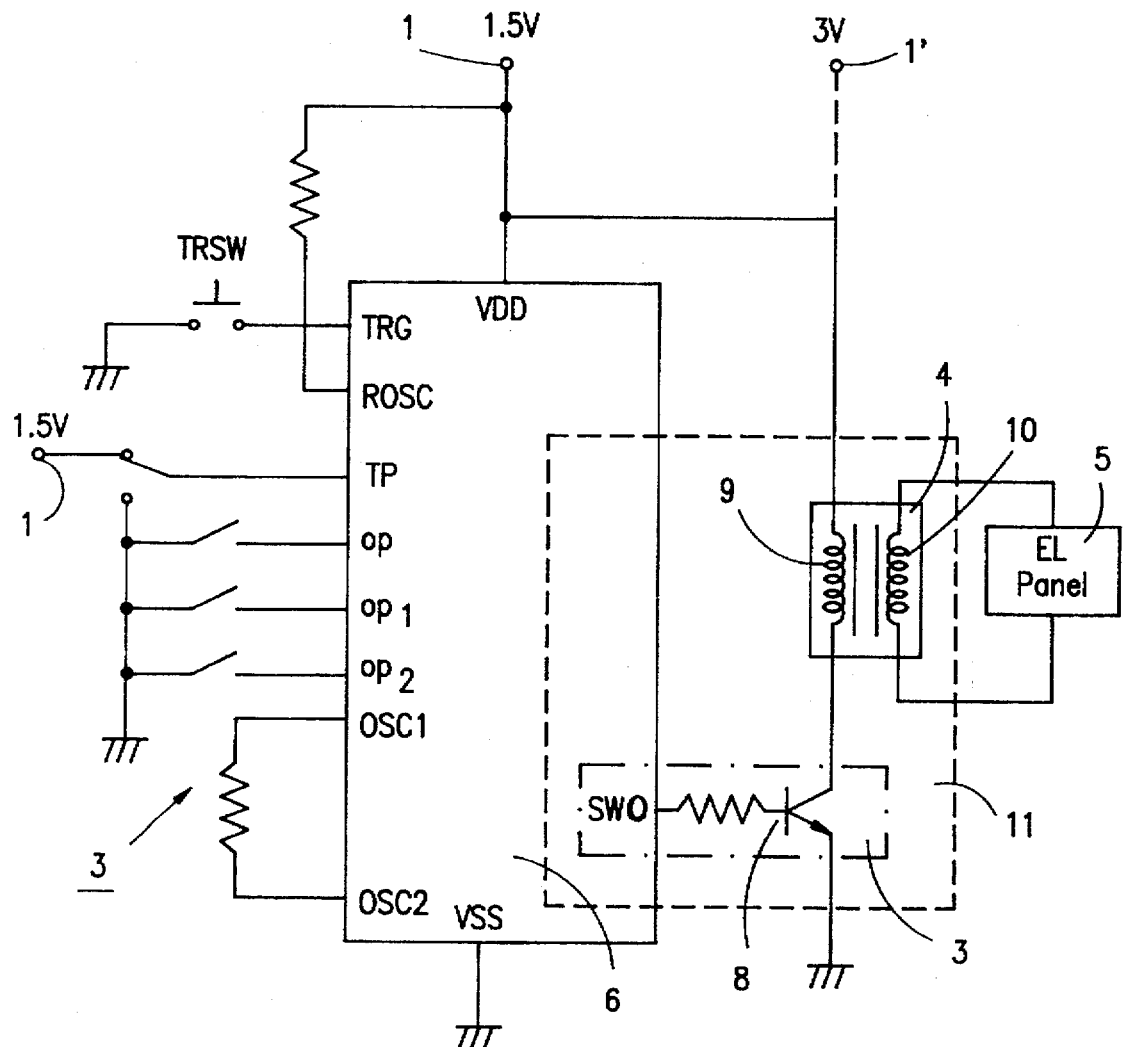
FIG. 3 is a schematic circuit diagram showing an improved controller for a single super thin lighting element.

In the embodiment shown in FIG. 3, the primary coil 9 of the transformer 4 is connected between the 1.5 VDC integrated circuit power supply and the collector of a transistor whose control electrode is connected to the square wave output SWO of the integrated circuit 6. As is known, the transformer serves to convert the square wave output present at the collector to a higher frequency output which more nearly resembles a sine wave due to the tuning effect provided by the inductance of the transformer secondary winding and the capacitance and internal resistance of the EL element (which forms an RLC circuit on the secondary side of the transformer.

Figure 4A:
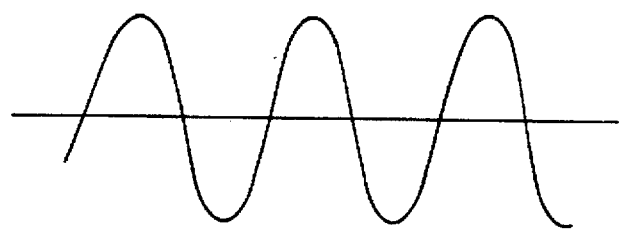
FIGS. 4a and 4b are waveform diagrams of the output of the preferred circuit.
Figure 4B:
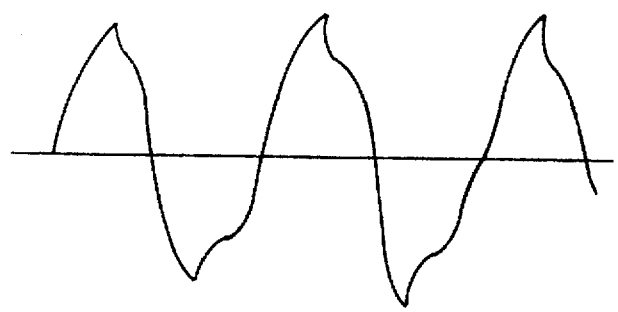

Those skilled in the art will appreciate that square wave output SWO, transistor 8, and transformer 4 in each of the embodiments of the invention together serve to provide the function of an inverter or inverting amplifier, as indicated by reference numeral 11 and the corresponding dashed line (long and short dashes) in FIG. 3. Although reference numeral 11 is not included in FIGS. 4–8, those skilled in the art will appreciate that the square wave output SWO, transistor 8, and transformer 4 of each of these embodiments also serves as inverter circuit for converting the DC input the ROSC terminal of the integrated circuit into the sine wave present in the secondary circuit of the transformer. In addition, those skilled in the art will appreciate that components may be included in addition to or instead of the transformer for the purpose of providing the desired sine wave, and that the "square wave output" of the integrated circuit can be any type of pulse of pulse modulated output, or may in the form of continuously varying output. In any case, whatever the form of the intermediate stages of conversion from DC to AC, the goal is to provide a sine wave of the type shown in FIG. 4a. FIG. 4b represents an actual oscilloscope trace achieved by the illustrated circuit.

Figure 5:
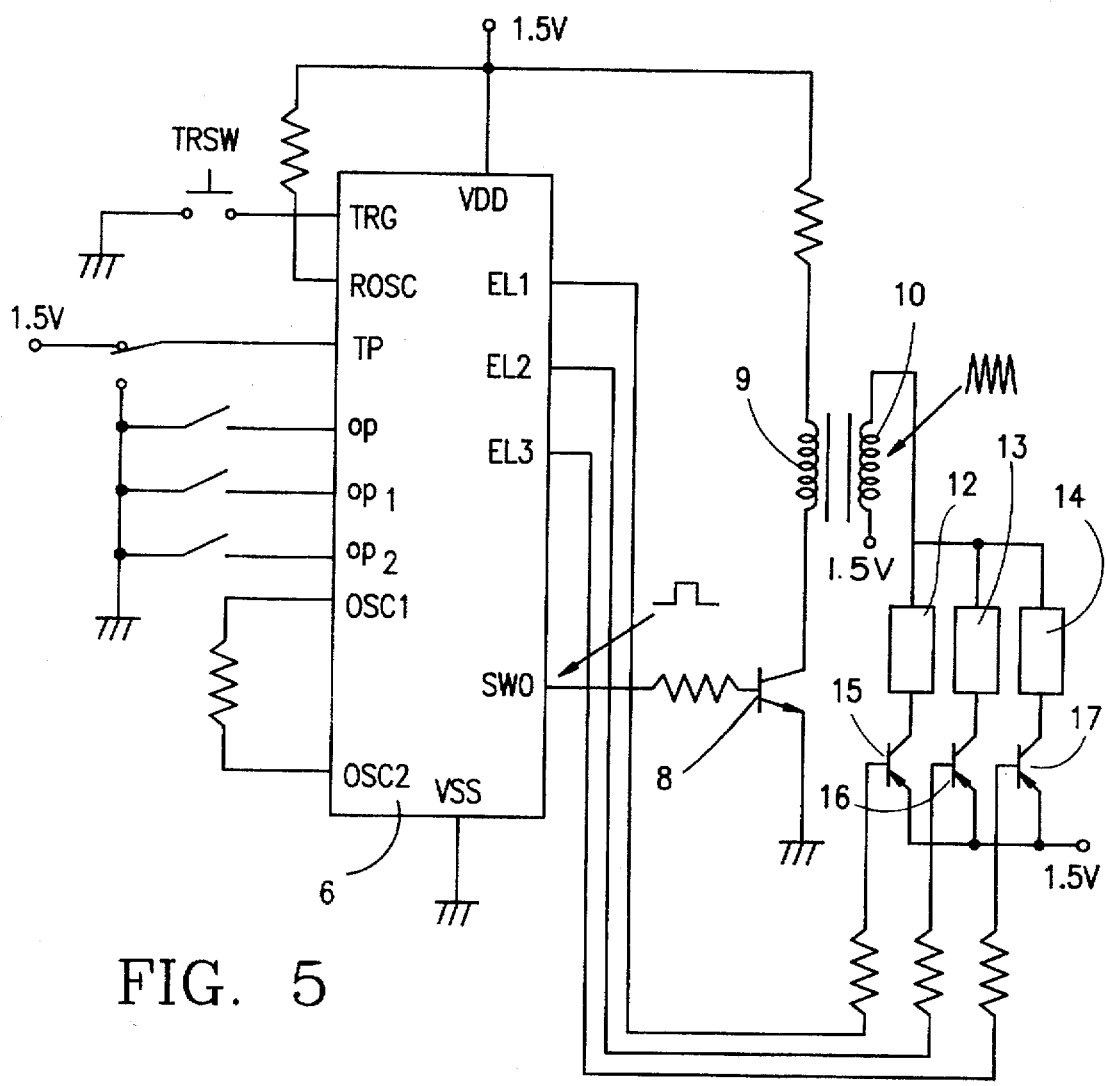
FIG. 5 is a schematic circuit diagram showing an improved controller arranged to control three same type super thin lighting elements.
Figure 6:
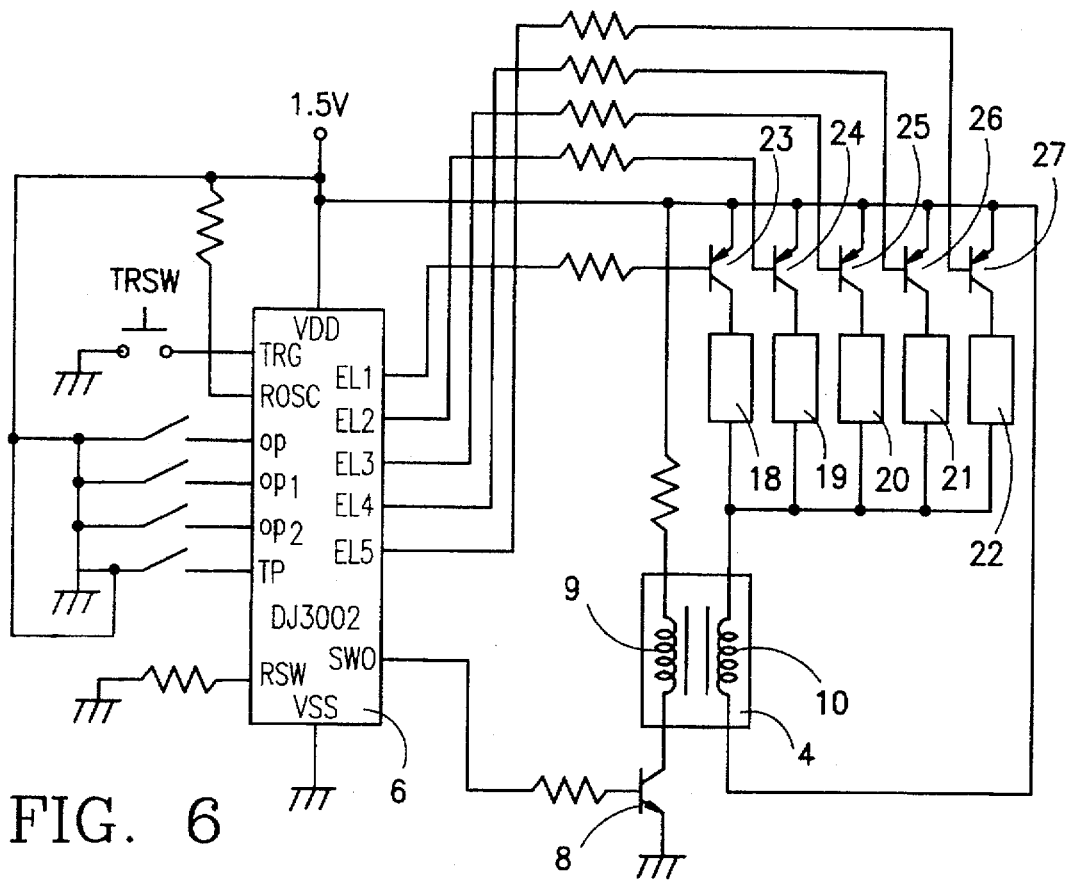
FIG. 6 is a schematic circuit diagram of a preferred embodiment of the invention arranged to control five same size super thin lighting elements.

FIG. 5 shows a variation of the preferred circuit arranged to control three like kind EL elements 12–14. In order to provide even illumination and individual control while at the same time isolating the integrated circuit from the EL elements, the three EL elements are switched on and off by means of transistors 15–17, with a high signal at any of the EL outputs turning off the corresponding EL elements. The signal at outputs EL1–EL3 which are connected to the control electrodes of transistors 15–17 is determined by the status of inputs OP, OP1, and OP2, as explained above and illustrated in FIG. 8-B. FIG. 6 shows a circuit equivalent to that of FIG. 5, but with five like kind EL elements 18–22, five control transistors 23–27, and five control outputs EL1–EL5 which can be activated in any desired order and duration, for any desired number of cycles, according the status of inputs OP, OP1, and OP2 in order to achieve such special effects as chasing, sequential, random, steady state, and fadein/fade in/fade out activation. Those skilled in the art will notice that, as illustrated, the transistors 12–14 and 18–22 are connected such that their emitters are directly tied to the 1.5V DC power source, with the bases connected to control outputs EL1–EL3 and EL1–EL5 respectively of integrated circuit 6, and the collectors connected to one electrode of the individual super thin lighting elements. The other electrode of each of the superthin lighting elements is also held at the potential of the DC power source whenever the square wave output of the integrated circuit is inactive, with a negative potential being induced across the lighting elements when transistor 8 is switched on. This is of course essentially a matter of expedience, and the circuit could also be arranged such that the terminals of the EL strips or panels are at ground potential when not turned on.

FIGS. 7 and 8 show two especially advantageous modifications of the circuit of FIG. 6, in which the inverter made up of the square wave output of integrated circuit 6, control transistor 8, and a transformer is modified to accommodate two different types of super thin lighting element, the first including EL elements 18'–22', and the second including EL element 28.

In the first of the two modifications, shown in FIG. 7, the inverter output is divided between two different output transformers 34 and 35, controlled by two different control transistors 8' and 8" (the two different control transistors being optional), while in the second modification, shown in FIG. 8, the inverter output is divided between different secondaries 36 and 37 of the same transformers 4', details of which are shown in FIG. 8-A. In either case, the output is matched to the physical characteristics of the EL element to be controlled by changing the number of turns, and therefore the inductance, of the transformer secondary so as to vary the characteristics of the RLC circuit formed by the capacitance and internal resistance of the EL elements and the inductance of the secondary coil, which can easily be accomplished by those skilled in the art to meet all known EL element characteristics.

The control circuit of the preferred embodiments of the invention can use any existing EL panel arrangement as the lighting elements, with any desired brightness by using different inverter output transformers or transformer secondaries. Because the electro-luminescent strips or panels can be decorated by silkscreen printing, stencilling, masking, and also varied by the arrangement of particles or of different elements within a panel using die cut methods to join together different color segments, and therefore can be used to form photographic or motion picture like effects, covering areas ranging from an inch square to hundreds of feet, the strips are an ideal choice for numerous different applications, including advertisements and displays, architectural elements, sporting goods, traffic signs, home appliances, message boards, Christmas or seasonal items, cards, picture frames, and so forth.

Figure 9:
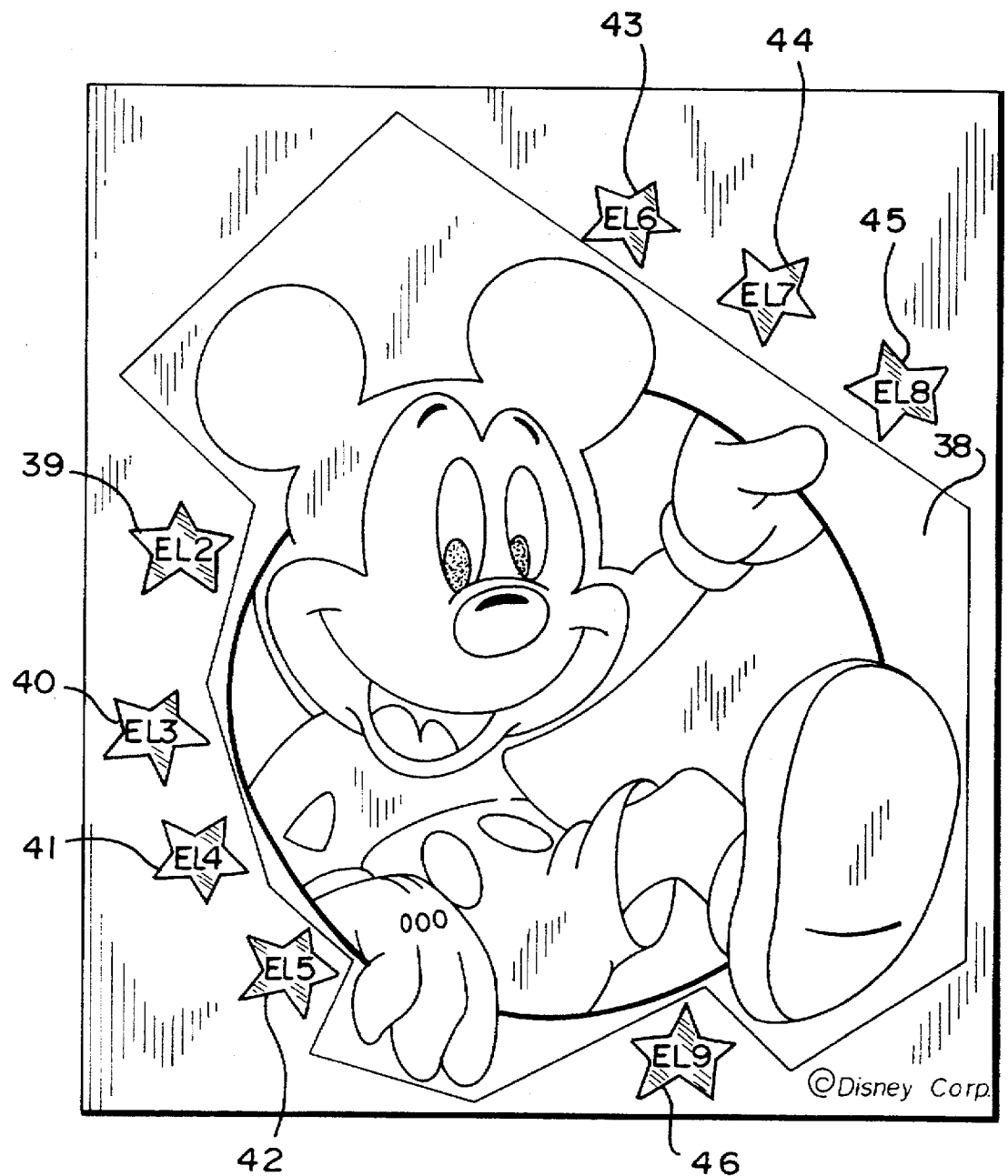
FIG. 9 shows an application of the preferred circuit to the display of a cartoon character.

An example of the versatility provided by the control circuit of the present invention is illustrated in FIG. 9, which shows the manner in which different size EL elements are arranged to form an attractive layout impossible with current control circuits. As illustrated in FIG. 9, which shows a first EL panel 38 of relatively large size and imprinted with a cartoon character 39, the first EL panel being in turn surrounded by eight smaller EL elements 39–46 in the form of stars which can be caused to flash according to a desired pattern while the main panel is lit in steady state. Those skilled in the art will appreciate that much more complex designs can easily be made, for example by drawing the cartoon character in two different positions, such as with a raised and lowered arm, and sequentially lighting the different positions to give an animation effect. It is noted that the cartoon character shown in the drawing is a copyrighted character, Mickey Mouse, the rights to which are owned by Disney, and that the illustration is for explanatory or educational purposes only.

Having thus described various preferred embodiments of the invention, those skilled in the art will appreciate that variations and modifications of the preferred embodiment may be made without departing from the scope of the invention. For example, because the cost of integrated circuits increases geometrically with the number of terminals, i.e., the area of the chip and the amount of silicon required, it is anticipated that the invention could be implemented using a plurality of smaller integrated circuits rather than one large integrated circuit. In addition, it is within the scope of the invention to greatly reduce the number of output options in order to save costs, providing for example the choice of only sequential or steady state operation. It is accordingly intended that the invention not be limited by the above description or accompanying drawings, but that it be defined solely in accordance with the appended claims.

We claim:

1. A control/driver circuit for a plurality of electro-luminescent lighting elements, comprising:
    a direct current (DC) power source; and
    an integrated circuit, said integrated circuit including:
        a function interface including an oscillator, said function interface being arranged to output pulses through first output terminals of said integrated circuit to respective said electro-luminescent lighting elements, the timing and duration of said pulses determining on/off cycles of said electro-luminescent lighting elements; and
        a component interface including means for converting pulses output by the oscillator into an approximate sine wave having a frequency and amplitude sufficient to cause a first one of said electro-luminescent lighting elements to emit light of a predetermined brightness and color when said lighting elements are activated by said pulses output from said function interface,
    wherein said component interface includes at least two second output terminals of said integrated circuit for converting said pulses output by said oscillator into different approximate sine waves, each of said second output terminals being connected to an additional one of said electro-luminescent elements, at least one of said additional ones of said electro-luminescent lighting elements having different physical properties from said first one of said electro-luminescent lighting elements,
    wherein said integrated circuit has a trigger input for initiating generation of said pulses, and control inputs for varying the timing and duration of said pulses to cause said outputs to activate a plurality of electro-luminescent lighting elements according to a predetermined pattern.

2. A circuit as claimed in claim 1, wherein said component interface includes a transformer having two secondary windings, said secondary windings having different numbers of turns.

3. A circuit as claimed in claim 1, wherein said component interface includes two transformers, the secondary windings of the two transformers having different numbers of turns.

4. A circuit as claimed in claim 1, wherein said component interface comprises a transformer, and wherein a primary winding of the transformer is connected between said DC power source and switching means for controlling the supply of voltage to said primary winding, said switching means in turn being opened and closed by a square wave output of said oscillator.

5. A circuit as claimed in claim 4, wherein said switching means comprises a first transistor having a base electrode connected to the output of the oscillator and a collector or emitter connected to said primary winding.

6. A circuit as claimed in claim 5, wherein said electro-luminescent lighting elements are connected between said component interface and control outputs of the integrated circuit, said control outputs controlling which of said electro-luminescent lighting elements is switched on according to inputs supplied to said control inputs.

7. A circuit as claimed in claim 6, further comprising a plurality of second transistors each having a control electrode connected to said control outputs of the integrated circuit, a collector and emitter of each of said second transistors being connected between a reference potential and a terminal of one of said electro-luminescent lighting elements, a second terminal of each of said electro-luminescent lighting elements being connected to a secondary winding of the transformer.

8. A circuit as claimed in claim 1, wherein said pattern is selected form the group consisting of flashing, random activation, sequential activation, chasing effects, fade in/fade out effects, scanning, and steady activation.

9. A circuit as claimed in claim 1, wherein an activation pattern for a first type of said electro-luminescent lighting elements is different than an activation pattern for a second type of said electro-luminescent lighting elements.

10. A circuit as claimed in claim 9, wherein said different types of electro-luminescent element have different shapes and colors.

11. A control/driver circuit for a plurality of electro-luminescent lighting elements, comprising:
   a direct current (DC) power source; and
   an integrated circuit, said integrated circuit including:
      a function interface including an oscillator, said function interface being arranged to output pulses through first output terminals of said integrated circuit to respective said electro-luminescent lighting elements, the timing and duration of said pulses determining on/off cycles of said lighting elements, said pulses causing said output to activate said electro-luminescent elements according to a predetermined pattern selected from the group consisting of flashing, random activation, sequential activation, chasing effects, fade in/fade out effects, scanning and steady activation; and
      a component interface including means for converting pulses output by the oscillator into an approximate sine wave having a frequency and amplitude sufficient to cause a first one of said electro-luminescent lighting elements to emit light of a predetermined brightness and color when said lighting elements are activated by said pulses output from said function interface,
   wherein said component interface comprises a transformer, and wherein a primary winding of the transformer is connected between said DC power source and switching means for controlling the supply of voltage to said primary winding, said switching means in turn being connected to a second output terminal of said integrated circuit and opened and closed by said pulses output by said oscillator.

12. A circuit as claimed in claim 11, wherein said switching means comprises a first transistor having a base electrode connected to the output of the oscillator and a collector or emitter connected to said primary winding.

13. A circuit as claimed in claim 12, wherein said integrated circuit has a trigger input for initiating generation of said pulses, and control inputs for varying a timing and duration of said pulses to cause said outputs to activate a plurality of electro-luminescent lighting elements according to said predetermined pattern.

14. A circuit as claimed in claim 13, wherein said electro-luminescent elements are connected between said component interface and control outputs of the integrated circuit, said control outputs controlling which of said electro-luminescent elements is switched on according to inputs supplied to said control inputs.

15. A circuit as claimed in claim 14, further comprising a plurality of second transistors each having a control electrode connected to said control outputs of the integrated circuit, a collector and emitter of each of said second transistors being connected between a reference potential and a terminal of an electro-luminescent element, a second terminal of each electro-luminescent element being connected to a secondary winding of the transformer.

16. A circuit as claimed in claim 13, wherein an activation pattern for a first type of said electro-luminescent elements is different than an activation pattern for a second type of said electro-luminescent elements.

17. A circuit as claimed in claim 16, wherein said different types of electro-luminescent element have different shapes and colors.

18. A driver/control circuit for a electro-luminescent element display, where an inverter is implemented using a square wave oscillator of a simple integrated circuit and a transformer, and in which a primary winding of the transformer is isolated from the square wave output of the integrated circuit.

19. A circuit as claimed in claim 18, wherein said inverter comprises two transformers having secondaries with different numbers of turns.

20. A circuit as claimed in claim 18, wherein said transformer has two secondary windings having different numbers of turns.

21. A circuit as claimed in claim 18, wherein said integrated circuit is made up of at least two discrete chips in order to increase the number of control terminals.

* * * * *